(12) United States Patent
Ralph

(10) Patent No.: US 10,369,501 B2
(45) Date of Patent: Aug. 6, 2019

(54) APPARATUS, SYSTEM AND METHOD FOR COMBINING MODULAR REPAIR PLUGS

(71) Applicant: M-I Drilling Fluids UK Ltd., Aberdeenshire (GB)

(72) Inventor: Andrew Ralph, Edinburgh (GB)

(73) Assignee: M-I Drilling Fluids UK Ltd., Aberdeen (GB)

( * ) Notice: Subject to any disclaimer, the term of this patent is extended or adjusted under 35 U.S.C. 154(b) by 371 days.

(21) Appl. No.: 15/145,759

(22) Filed: May 3, 2016

(65) Prior Publication Data

US 2017/0319991 A1 Nov. 9, 2017

(51) Int. Cl.
*B01D 35/28* (2006.01)
*B07B 1/46* (2006.01)
*E21B 21/06* (2006.01)
*B01D 33/03* (2006.01)

(52) U.S. Cl.
CPC ............. *B01D 35/28* (2013.01); *B01D 33/03* (2013.01); *B07B 1/4627* (2013.01); *B07B 1/4645* (2013.01); *E21B 21/065* (2013.01); *B01D 2201/4084* (2013.01)

(58) Field of Classification Search
CPC ............. B01D 35/28; B01D 33/03; B01D 2201/4084; B07B 1/4627; B07B 1/4645; E21B 21/065
See application file for complete search history.

(56) References Cited

U.S. PATENT DOCUMENTS

| | | | |
|---|---|---|---|
| 1,749,755 A | | 3/1930 | Downer |
| 2,241,257 A | * | 5/1941 | Gronberg .................. 140/3 R |
| 3,261,393 A | | 7/1966 | Templeton |
| 4,840,379 A | | 6/1989 | Thoman, Jr. |
| 5,076,924 A | | 12/1991 | Persson et al. |
| 5,137,622 A | | 8/1992 | Souter |
| 5,275,293 A | | 1/1994 | Crider |
| 5,277,319 A | | 1/1994 | Henry, Jr. |
| 5,490,598 A | | 2/1996 | Adams |
| 5,609,715 A | | 3/1997 | Gallentine |
| 5,626,234 A | | 5/1997 | Cook et al. |
| 5,797,975 A | | 8/1998 | Davis |
| 5,851,393 A | | 12/1998 | Carr et al. |
| 5,928,448 A | | 7/1999 | Daws |

(Continued)

FOREIGN PATENT DOCUMENTS

| | | |
|---|---|---|
| CH | 453047 | 5/1968 |
| DE | 1411679 | 1/1969 |

(Continued)

OTHER PUBLICATIONS

International Search Report and Written opinion for PCT/GB2008/050528, dated Jul. 20, 2009; 7 pages.

(Continued)

*Primary Examiner* — Thomas M Lithgow
(74) *Attorney, Agent, or Firm* — Jeffrey D. Frantz

(57) ABSTRACT

An apparatus and methods secure modular repair plugs to one another to repair different sized cells of a screen. A modular repair plug is configured to attach to another modular repair plug to create an extended modular repair plug. The modular repair plug can fit within a first, smaller cell, and the extended modular repair plug can fit within a larger second cell.

10 Claims, 3 Drawing Sheets

(56) References Cited

U.S. PATENT DOCUMENTS

| | | | |
|---|---|---|---|
| 5,988,397 | A | 11/1999 | Adams et al. |
| 6,029,824 | A | 2/2000 | Adams |
| 6,032,806 | A | 3/2000 | Leone et al. |
| 6,152,307 | A | 11/2000 | Adams et al. |
| 6,220,449 | B1 | 4/2001 | Schulte, Jr. et al. |
| 6,267,247 | B1 | 7/2001 | Seyffert et al. |
| 6,275,293 | B1 | 8/2001 | Brown |
| 6,401,934 | B1 | 6/2002 | Largent et al. |
| 6,629,610 | B1 | 10/2003 | Adams et al. |
| 6,675,975 | B1 | 1/2004 | Cook et al. |
| 6,713,190 | B2 | 3/2004 | Cook et al. |
| 6,722,504 | B2 | 4/2004 | Schulte et al. |
| 6,736,270 | B2 | 5/2004 | Adams et al. |
| 6,872,466 | B2 | 3/2005 | Robertson et al. |
| 6,886,697 | B2 | 5/2005 | Russell et al. |
| 6,956,168 | B2 | 10/2005 | Herth |
| 6,983,849 | B1 | 1/2006 | Toler et al. |
| 7,665,272 | B2 | 2/2010 | Reen |
| 7,914,009 | B1 | 3/2011 | Gerspach |
| 8,961,784 | B2 * | 2/2015 | Ralph ................ B07B 1/4627 210/232 |
| 9,073,268 | B2 | 7/2015 | Robertson et al. |
| 2002/0088532 | A1 | 7/2002 | Cook et al. |
| 2002/0088747 | A1 | 7/2002 | Cook et al. |
| 2005/0001136 | A1 | 1/2005 | Fleishman |
| 2010/0201081 | A1 | 8/2010 | Ralph |
| 2011/0094950 | A1 | 4/2011 | Dahl |
| 2011/0180461 | A1 | 7/2011 | Lane et al. |
| 2015/0001136 | A1 | 1/2015 | Galloway McLean |
| 2016/0052022 | A1 | 2/2016 | Dahl |

FOREIGN PATENT DOCUMENTS

| | | |
|---|---|---|
| DE | 1680519 | 2/1970 |
| EP | 1293265 | 3/2003 |
| GB | 2322590 | 9/1998 |
| GB | 2379177 | 3/2003 |
| GB | 2451263 | 4/2012 |
| JP | H1072055 | 3/1998 |
| JP | 2008094486 | 4/2008 |
| WO | 9200133 | 1/1992 |
| WO | 9903601 | 1/1999 |
| WO | 2009013521 | 1/2009 |
| WO | 2009013522 | 1/2009 |
| WO | 2015/142386 A2 | 9/2015 |

OTHER PUBLICATIONS

International Search Report and Written Opinion for PCT/GB2008/050527, dated Jan. 14, 2009; 14 pages.

International Search Report and Written Opinion for PCT/GB2013/050287, dated May 15, 2013; 12 pages.

Caamono, "Hard Rules for Soft-tough Overmolding," Machine Design, May 9, 2002, pp. 60, 62-65.

Johannaber, et al., "Handbuch Spritzgiessen, PASSAGE," Hanbuch Spritzgiessen, Jan. 1, 2002, pp. 506-509, XP002299967 (English translation is not available).

International Search Report and Written Opinion for the equivalent International patent application PCT/US2017/030479 dated Aug. 11, 2017.

International Preliminary Report on Patentability for the equivalent International patent application PCT/US2017/030479 dated Nov. 15, 2018.

* cited by examiner

APPARATUS, SYSTEM AND METHOD FOR COMBINING MODULAR REPAIR PLUGS

BACKGROUND OF THE INVENTION

Separators are used to separate solids from liquids in oil-based and/or water-based drilling fluids, referred to as mud, that are retrieved from oilfield drilling operations. Such separators may have sifting and/or filtering screens to remove solids from a slurry. One type of apparatus used to separate solids from the mud is referred to in the industry as a shale shaker. The shale shaker, also known to as a vibratory separator, uses a sieve to accept used drilling mud to clean the mud for further use in drilling operations.

Mud serves multiple purposes in the oilfield services industry. For instance, mud acts as a lubricant to cool rotary drill bits and facilitate faster cutting rates. Further, dispersion of the mud around a drill string or otherwise in the wellbore assists in counterbalancing various pressures in subterranean formations. Various weighting and lubrication agents are mixed into the mud to obtain a desirable mixture for the type and construction of the rock formation to be drilled. Since the cost of mud can be expensive, drillers and service companies typically reclaim and reuse mud in drilling operations. Another purpose of the drilling mud is to carry rocks and/or cuttings from the drill bit to the surface.

Typically, shale shakers use sifting and/or filtration screens to separate cuttings from drilling fluid in on-shore and off-shore oilfield drilling operations. The shale shaker screens comprise a mesh stretched across a frame. The mesh allows fluid and/or particles smaller than a predetermined size to pass through the separating screen. Vibrational movement cause the cuttings to convey across the shale shaker and eventually wears and breaks the mesh of the screen. A small portion of the mesh may rip or break during use, thus replacing the entire screen to repair only a damaged section of the screen may be costly. As a result, plugs have been used to block a portion of the mesh having a rip or tear. Devices described herein may be utilized to plug or otherwise repair a damaged screen used in the oilfield and/or other industries.

DETAILED DESCRIPTION

Embodiments disclosed herein are applicable to separation devices that may be utilized in numerous industries. While specific embodiments may be described as utilized in the oilfield services and related industries, such as use with shale shakers, the device may be applicable in other industries where separation of liquid-solid, solid-solid and other mixtures may be separated. The embodiments may be utilized in the mining, pharmaceutical, food, medical or other industries to separate such mixtures.

In the following detailed description, reference is made to accompanying figures, which form a part hereof. In the figures, similar symbols or identifiers typically identify similar components, unless context dictates otherwise. The illustrative embodiments described herein are not meant to be limiting. Other embodiments may be utilized, and other changes may be made, without departing from the spirit or scope of the subject matter presented here. It will be understood that the aspects of the present disclosure, as generally described herein, and illustrated in the figures, may be arranged, substituted, combined and designed in a wide variety of different configurations, which are explicitly contemplated and form part of this disclosure.

Figure 1:
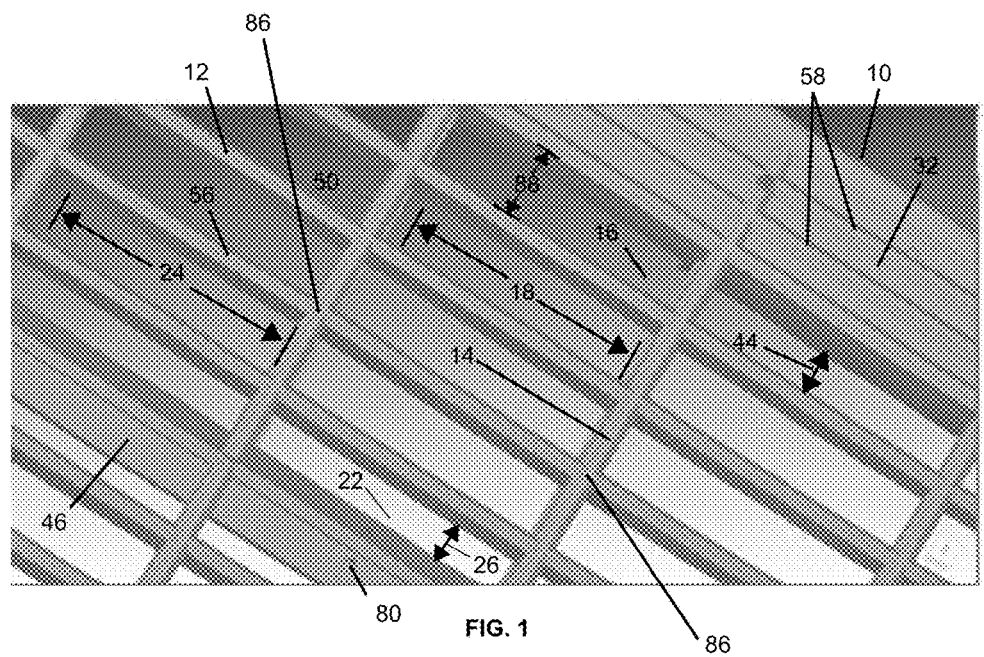
FIG. 1 illustrates a top view of a screen with various cell sizes in accordance with an embodiment of the invention.

Referring to FIG. 1, an embodiment of a screen assembly 10 is shown. In an embodiment, the screen assembly 10 may be defined by a frame 32 that may be generally rectangular, square, or circular in shape. A person having ordinary skill in the art will appreciate that a screen with a shape other than a rectangle, square and/or circle may be used in connection with the embodiments described herein.

Figure 6:
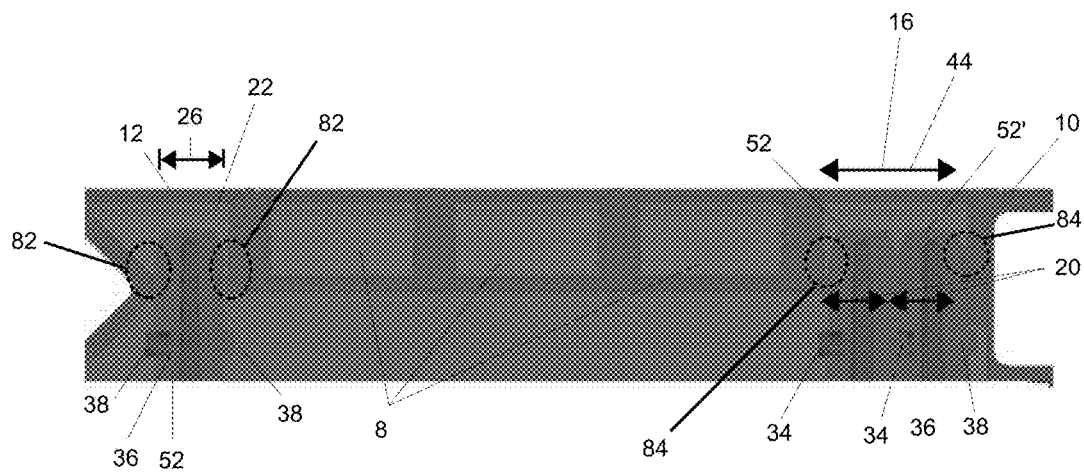
FIG. 6 illustrates a side view of the modular repair plug installed in the screen in accordance with an embodiment of the invention.

The screen assembly 10 may have one or more layers of filtration material used to filter or separate a first substance from a second substance. For example, if used to filter drilling fluid, the screen assembly 10 may have one or more layers of screening material, such as mesh or interwoven wires, that permit drilling fluid and weighting agents below a predetermined size to pass through the screen assembly 10 while preventing large rock cuttings or particles above the predetermined size from passing through the screen assembly 10. Screening material, such as the screen assembly 10 formed with layers of filtration material, may be generally positioned on top of the grid 12 as shown in FIG. 6.

The frame 32 of the screen 10 may have a grid 12 defined by a plurality of cells, such as a first cell 16. In an embodiment, the grid 12 may have a composite material molded over a frame, such as a metal frame that may comprise metal bars, wires or other material to structurally reinforce the grid 12. In such an example, the grid 12 may be made of composite material formed in a mold (not shown in the FIGS.). The screen assembly 10 may be positioned on top of the grid 12 after the grid 12 may be formed in a mold. Application of heat may secure the grid 12 to the screen assembly 10 and/or screening material in and/or associated with the screen assembly 10. The use of a grid formed from a mold and/or the screen assembly 10 formed form composite materials are provided as examples, and a person of ordinary skill in the art will appreciate that the description should not be limited to such an embodiment. The grid 12 may have first cross-members 50 that may be positioned at an interval width 24 that may coincide with a width 18 of the first cell 16. A second cross-member 56 may intersect and/or interconnect with the first cross-member 50 to form an intersection point 86 on the grid 12 as shown in FIG. 1. In an embodiment, the second-cross member 56 may be referred to as a crossbar. The second cross-member 56 may extend across the grid 12 to define a length 88 of the first cell 16. In an embodiment, a ridge 14 may be formed on and/or extend from the first cross-member 50. In an embodiment, the ridge 14 may extend from the first cross-member 50 and/or the second cross-member 56.

In an embodiment, the grid 12 may have a second cell 22 generally defined by the intersection of the first cross-member 50 and a raised surface 46 that may connect to and extend from the second cross-member 50. The raised surface 46 may extend across the grid 12. The second cell 22 may have dimensions different from the first cell 16 with a length 26 defined by the second cross-member 56 that may be different than the length 88 of the first cell 16. The width of the second cell 22 may be substantially similar to and/or equal to the width 18 of the first cell 16. In an embodiment, the first cell 16 and/or the second cell 22 may support a mesh, such as a woven wire mesh and/or a wire filter cloth.

The grid 12 may have cells of differing sizes. Namely, the size of the second cell 22 may differ from the size of the first cell 16. The grid 12 should not be limited to any specific material, size and/or method of construction. The grid 12 is shown as an example to show portions of a screen 10 that may require repair due to damage.

Figure 4:
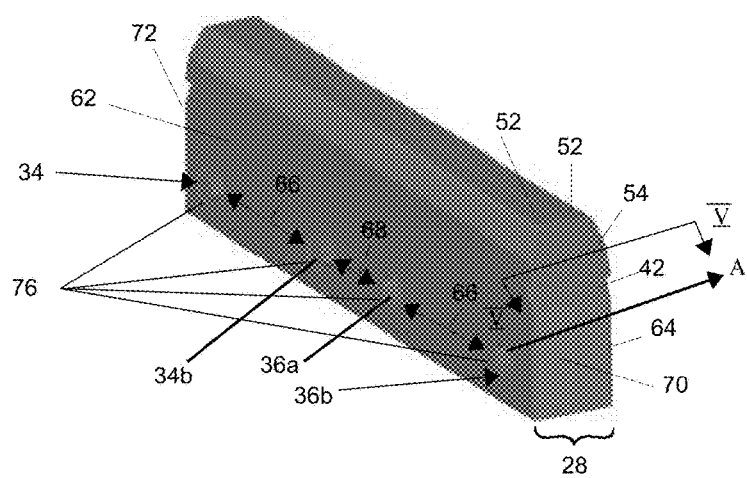
FIG. 4 illustrates a perspective view of a modular repair plug in accordance with an embodiment of the invention.

Damage to either the first cell 16 and/or the second cell 22 may require a repair and/or replacement part fabricated for the cell to repair. Accordingly, a modular repair plug 52 as shown in FIG. 4 may have securing mechanisms 76 to attach or secure to the modular repair plug 52 to expand in size and/or to increase dimensions such as the length and/or width of the modular repair plug 52 to conform in size to the cell to repair. The modular repair plugs 52 may be attached in a side-by-side orientation along direction A to assemble an extended modular repair plug 28. A combined length 44 may extend from a left side 62 and a right side 64 parallel to and positioned opposite to the left side 62 of the extended modular repair plug 28 in direction A as shown in FIG. 4. In an embodiment, the combined length 44 may be equivalent to and/or substantially similar to a length 88 of the first cell 16 as shown in FIG. 1.

The extended modular repair plug 28 may insert from underneath the grid 12 or may be inserted into a top of the grid 12. If inserted into a top of the grid 12, the extended modular repair plug may contact the ridge 14 to prevent further movement in the first cell 16. The extended modular repair plug 28 may secure to the grid 12 by a bolt, screw or other device as will be appreciated by a person having ordinary skill in the art. A length 20 of the modular repair plug 52 may correspond with the length 26 of the second cell 22. Accordingly, the modular repair plug 52 may be inserted into the second cell 22 to prevent material, such as liquid, for example drilling fluid, from passing through the second cell 22. The modular repair plug 52 can thus repair the screen 10 and permit continued use of the screen 10.

Figure 5:
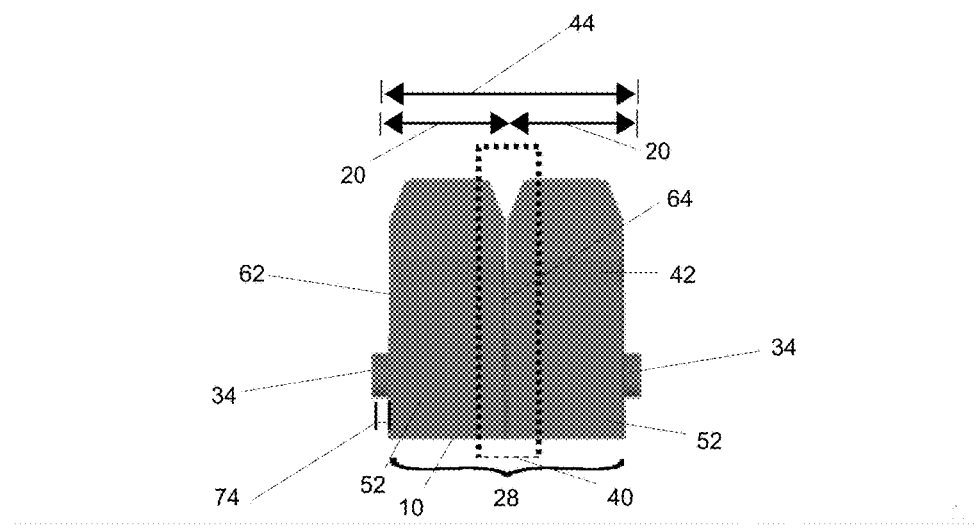
FIG. 5 illustrates a front view taken generally along line IV-IV of a modular repair plug in accordance with an embodiment of the invention.

The size of the second cell 22 may be a multiple or a fraction of the size of the first cell 16. In an embodiment, the cell 22 may be half the size of the first cell 16. Thus, the length 26 of the second cell 22 may be equivalent to half the combined length 44 or to half the length 88 of the first cell 16. The modular repair plug 28 may have a groove 42, as shown in FIGS. 4 and 5. The groove 42 may extend in the length-wise direction A as shown in FIG. 4 and/or be positioned about the entire perimeter of the modular repair plug 52. Namely, the groove 42 may extend along the left side 62 and/or the right side 64. In an embodiment, the groove 42 may be sized and shaped to engage the ridge 14. Accordingly, the ridge 14 may receive the groove 42 to assist the modular repair plug 52 in securing to the grid 12.

In an embodiment, the grooves 42 may be horizontally aligned when the modular repair plugs 52 are attached in a side-by-side orientation as shown in FIG. 5. The aligned grooves 42 of the extended modular repair plug 28 may receive the ridge 14 that may extend from the second cross-member 56 and/or the first cross-member 50 as shown in FIG. 1 to enter into and/or engage with the first cell 16.

The raised surface 46 may connect to and extend from the second cross-member 50 to extend across the grid 12. The raised surface 46 may have an over-molded metal bar and/or other reinforcement piece to provide structural rigidity to the grid 12. In an embodiment, the raised surface 46 on the grid 12 may have an indentation 80 from being removed from a mold and/or may provide structure to assist in, for example, stacking the grids 12. A peripheral ridge 58 may extend from the frame 32 on an end of the screen 10 that may form a handle or attachment end for the screen to a vibrating shale shaker (not shown in the FIGS.).

Figure 2:
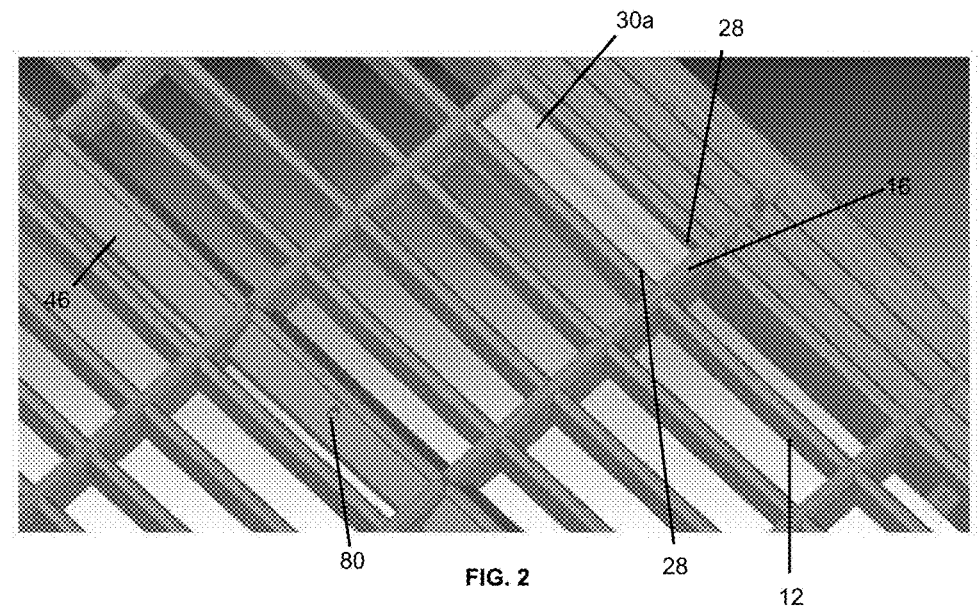
FIG. 2 illustrates a top view of a screen with a particular cell size emphasized in accordance with an embodiment of the invention.

Referring to FIG. 2, the extended modular plug 28 may be inserted in a first region 30a that corresponds to the first cell 16. After installation in the first cell 16, the extended modular plug 28 can prevent solids or liquids from passing through the first cell 16. The extended modular plug 28 may be flush with the screen 10 and/or the second cell 22 to prevent unwanted and/or excessive accumulation of solids and/or liquids. The extended modular plug 28 may be made of a material to protect against abrasion and/or deterioration that may be caused by solids in a slurry that may pass over the extended modular plug 28. In an embodiment, the extended modular plug 28 may be made of a composite material and/or a material similar to the grid 12 of the screen 10.

Figure 3:
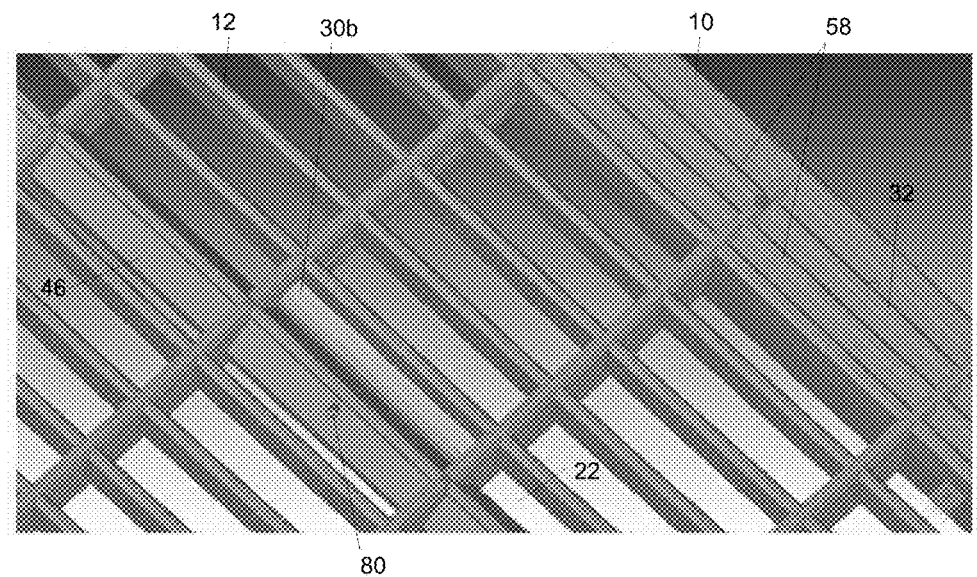
FIG. 3 illustrates a top view of a screen with another cell size emphasized in accordance with an embodiment of the invention.

Referring to FIG. 3, the grid 12 is shown with a second region 30b that may correspond to the second cell 22 with the length 26, which may be less than the length 88 of the first cell 16. In an embodiment, the width 18 of the first cell and/or the width 24 of the second cell 22 may be equal or similar. Further, the length 26 of the second cell 22 may be half the length 88 of the first cell 16. Accordingly, the second cell 22 may receive the modular plug 52 for repair. The first cell 16 with the length 88 may receive the extended modular plug 28 with the combined length 44 for repair. The modular plug 52 that may be inserted in the second cell 22 may plug and/or otherwise block material from moving through the second cell 22. The modular plug 52 may be positioned in the second cell 22 after, for example, screening material over the second cell 22 is damaged and is in need of repair. In an embodiment, the groove 42 of the modular repair plug 52 may engage the ridge 14 within the interior of the second cell 22, such as on an interior of the first cross-member 50 and/or the second cross-member 56.

Referring to FIG. 4, the extended modular plug 28 that may be formed by the assembly of two modular plugs 52 that may be attached to each other in a side-by-side orientation is shown. The modular plug 28 may have a front surface 70 and a rear surface 72 that may be positioned opposite to the front surface 70. Further, the modular plug 28 may have the left side 62 and the right side 64 that may be parallel to and positioned opposite to the left side 62. In an embodiment, a first securing mechanism, such as a first protrusion 34a and/or a second protrusion 34b may extend from the left side 62. The protrusion 34a and/or the protrusion 34b may each have a substantially cylindrical shape. The second protrusion 34b may extend from the left side 62 at a width 66 from a first protrusion 34a. A gap 68 may separate the second protrusion 34b as shown in FIG. 4 from a second securing mechanism, such as pockets 36a, 36b. Further, a first pocket 36a may be separated from a second pocket 36b by the width 66.

The protrusion 34a and the protrusion 34b, both extending from either the left side 62 or the right side 64, may insert into and/or attach with the pocket 36a and the pocket 36b that may be formed in the opposite side, namely the right side 64 or the left side 62, respectively. Furthermore, in an embodiment, the protrusion 34a, the protrusion 34b, the pocket 36a and the pocket 36b may be collectively referred to as the securing mechanisms 76.

The modular repair plugs 52 as shown in FIG. 4 may allow for the engagement of corresponding securing mechanisms 76 to form the extended modular repair plug 28. The combined length 44 of the extended modular repair plug 28 may be equivalent to the length 20 of each modular repair plug 52 combined in the length direction A as shown in FIG. 4. The combined length 44 may correspond to the width 88 of the first cell 16 to allow the extended modular repair plug 28 to enter into and/or attach with the first cell 16.

Referring to FIG. 5, a front view is shown of the extended modular repair plug 28 that may be formed by attachment of two modular plugs 52 in a side-by-side orientation. The extended modular plug 28 may have the combined length 44 that may be approximately twice the length 20 of the modular repair plug 52. The left side 62 may have the protrusion 34a and/or the protrusion 34b extend a width 74 from the left side 62. Similarly, the pocket 36 may extend inward with a depth similar to and/or identical to the width 74 such that, for example, the pocket 36a may receive the protrusion 34a upon insertion. A contact region 40 may be defined where the right side 64 of the modular repair plug 52 contacts the left side 62 of the modular repair plug 52. Engagement of corresponding securing mechanisms 76 on the modular repair plugs 52 may prevent against unwanted movement and/or friction at the contact region 40 between the modular repair plugs 52.

The modular repair plug 52 may have the length 20 as shown in FIG. 5. The length 20 of each modular repair plug 52 may be combined to produce the combined length 44 of the extended modular repair plug 28. The combined length 44 may allow for insertion and/or fit of the extended modular repair plug 28 into the first cell 16 as shown in FIG. 1. The defined length 20 may allow for the insertion and/or fit of the modular repair plug 52 into the second cell 22 as shown in FIG. 1.

In an embodiment, a groove 82 may be generally v-shaped and may extend from the left side 62 to the right side 64 of the modular repair plug 52. The groove 82 may assist in insertion into and/or attachment of the modular repair plug 52 and/or the extended modular repair plug 28 into the second cell 22 and/or the first cell 16, respectively.

The securing mechanisms 76 may be an example of how the modular repair plug 52 may connect to and/or secure to another modular repair plug 52 to increase in size, such as length or width. The securing mechanisms 76 may have a portion on one of the modular repair plugs 52 that engages and/or secures to a portion on another modular repair plug 52. The modular repair plugs 52 can snap, slide or otherwise engage one another to form the extended modular repair plug 28. For example, in an embodiment, the modular repair plug 52 may have a tongue-and-groove type connector with a tongue on one side and a groove on the other end to attach the modular repair plug 52 to another modular repair plug 52.

The modular repair plugs 52 may connect or secure using various techniques as will be appreciated by a person having ordinary skill in the art, such as engagement via a bolt, screw, nail or other attachment mechanism, or adhering via an adhesive, adhesive strips or other material. The modular repair plugs 52 may be removably secured to one another. In an embodiment, more than two of the modular repair plugs 52 may be connected or secured together using the same principles as described herein.

Referring to FIG. 6, a side view of an embodiment of the grid 12 of the screen 10 is shown. The second cell 22 having length 26 may receive the modular repair plug 52. As shown in FIG. 5, the protrusion 34 may extend the width 74 from either the left side 62 or the right side 64 of the modular repair plug 52. The intermediary cells 8 may extend throughout the grid 12 from the second cell 22 to the first cell 16.

As shown in FIG. 6, the first cell 16 may receive the extended modular repair plug 28 that may be formed by the assembly of two modular repair plugs 52 in a side-by-side orientation. Insertion of the extended modular repair plug 28 into the first cell 16 may abut or contact the cross-members 50 and/or cross-members 56. The extended modular repair plug 28 may insert into the first cell 16 over the ridge 14 that may be generally at region 84 and engaged the groove 42 to secure the extended modular repair plug 28 into the first cell 16. The extended modular repair plug 28 may snap into and/or otherwise engage with the first cell 16 as the groove 42 engages the ridge 14 at the region 84 on the grid 12 as shown in FIG. 6. The extended modular repair plug 28 may be inserted to block or plug the first cell 16. The extended modular repair plug may be positioned in the first cell 16 such to be flush with other cells, such as the second cell 12. Inserting the modular repair plug 52 into the second cell 22 may engage the groove 42 with the ridge 14 within the interior of the second cell 22 at 82.

In an embodiment, the first cell 16 and/or the second cell may be identified as being damaged. The extended modular repair plug 28 may be assembled by attaching the modular repair plug 52 with the modular repair plug 52 to repair the first cell 16. The extended modular repair plug 28 may be inserted into the first cell 16 to repair damage to the first cell 16. The modular repair plug 52 may be inserted into the second cell 22 to repair damage to the second cell 22. The first cell 16 and/or the second cell 22 may be blocked by either the extended modular repair plug 28 and/or the modular repair plug 52.

Although the preceding description has been described herein with reference to particular means, materials, and embodiments, it is not intended to be limited to the particulars disclosed herein; rather, it extends to all functionally equivalent structures, methods, and uses, such as are within the scope of the appended claims.

The invention claimed is:

1. An apparatus comprising:
 a first modular repair plug shaped for insertion into a shale shaker screen wherein the first modular repair plug has a first width defined between a first end and an opposite second end of the first modular repair plug and a first length defined between a first side and an opposite second side of the first modular repair plug;
 a second modular repair plug shaped for insertion into a shale shaker screen, wherein the second modular repair plug has a second width;
 a first securing mechanism on a side of the first modular repair plug configured to secure the first modular repair plug to the second modular repair plug to form an extended modular repair plug having a combined width; and
 a groove extending across the first width and the first length of the first modular repair plug such that the groove is provided above the first securing mechanism when the first modular repair plug is in an upright position.

2. The apparatus of claim 1 further comprising:
a second securing mechanism on the second modular repair plug to engage the first securing mechanism of the first modular repair plug.

3. The apparatus of claim 2 wherein the first securing mechanism is a protrusion extending from the first modular repair plug and the second securing mechanism is a pocket formed in the second modular repair plug wherein insertion of the protrusion into the pocket attaches the first modular repair plug to the second modular repair plug.

4. The apparatus of claim 1 wherein the combined width is greater than the first width of the first modular repair plug and the second width of the second modular repair plug.

5. The apparatus of claim 1 wherein at least one of the first modular repair plug and the second modular repair plug fit in a cell of the shale shaker screen.

6. The apparatus of claim 1 further comprising:
a ridge on a first cross-member of a grid of the shale shaker screen, wherein the ridge engages the groove of the first modular repair plug.

7. The apparatus of claim 6 wherein the ridge is within an interior of a first cell on the first cross-member or a second cross-member of the grid of the shale shaker screen.

8. The apparatus of claim 7, wherein the groove extends across the first length of the first modular repair plug and the combined width of extended modular repair plug.

9. The apparatus of claim 1 wherein the first modular repair plug is removably secured to the second modular repair plug and further wherein the first modular repair plug is separable from the second modular repair plug without damaging the first modular repair plug or the second modular repair plug.

10. An apparatus comprising:
a first modular repair plug shaped for insertion into a shale shaker screen wherein the first modular repair plug has a first width;

a second modular repair plug shaped for insertion into the shale shaker screen wherein the second modular repair plug has a second width;

a first securing mechanism on at least one side of the first modular repair plug configured to secure the first modular repair plug to the second modular repair plug to form an extended modular repair plug having a combined width; and a groove provided about an entire perimeter of the first modular repair plug such that the groove is provided above the first securing mechanism when the first modular repair plug is in an upright position.

* * * * *